United States Patent Office 3,772,392
Patented Nov. 13, 1973

3,772,392
PROCESS FOR PREPARING PARAFORMALDEHYDE
Teo Paleologo and Jacob Ackermann, Milan, Italy, assignors to Societá Italiana Resine S.I.R. S.p.A., Milan, Italy
No Drawing. Continuation of abandoned application Ser. No. 743,318, July 9, 1968. This application Aug. 24, 1972, Ser. No. 283,445
Int. Cl. C07c 47/10
U.S. Cl. 260—615.5    9 Claims

ABSTRACT OF THE DISCLOSURE

A process for the preparation of paraformaldehyde is provided in which solid particulate paraformaldehyde is prepared and then cured in the presence of a regulator selected from:
(i) basic organic compounds of a $pK_b$ between 6 and 12
(ii) high-temperature condensation products of formaldehyde and highly basic amines of $pK_b$ between 2 and 6
(iii) middle-basic organic compounds, being heterocyclic compounds formed by one, two or three hexatomic condensed and hydrogenated rings in which the heteroatom or atoms is or are nitrogen.

---

This is a continuation of application Ser. No. 743,318, filed July 9, 1968, and now abandoned.

The invention relates to the preparation of paraformaldehyde.

Paraformaldehyde is a mixture of polymers of formaldehyde of different molecular weight. It is stable towards commercial aqueous formaldehyde solutions of high formaldehyde content, which makes it suitable for storage and economically convenient to transport.

Paraformaldehyde is a high-concentration source of monomeric formaldehyde which may be utilized, for instance, in preparing thermosetting resins such as phenol and melamine resins, or thermoplastic resins having essentially a formaldehyde base (polyacetal polymers and copolymers).

For use, paraformaldehyde may be dissolved in water or alcohol, in which it depolymerizes and forms solutions of desired concentrations.

For the paraformaldehyde to be commercially useful its degree of polymerization should not be low, for products of low melting point and semi-solid character are difficult to handle, nor should it be high because products of high melting point are degradable only with difficulty and not very soluble.

Commercial paraformaldehyde usually titrates over 90%, commonly over 95%, as it has undergone heat treatments designed to obtain a product in the form of powder, flakes or other form not tending to pack. However, on account of the heat treatments the degree of polymerization is undesirably raised.

Even where the formaldehyde content is not very high, so that the average molecular weight is relatively low, the resulting paraformaldehyde always contains a considerable percentage of product of high molecular weight which is almost water-insoluble and has low reactivity.

Moreover, paraformaldehyde is required by the trade to be ash-free, of a low impurity content, and its aqueous solutions should be approximately of a pH between 2.8 and 5.5, the pH range of commercial formalin solutions.

Paraformaldehyde can be prepared by a two-step process comprising a preliminary concentration of commercial aqueous formalin in a liquid phase, using for example conventional concentration-evaporation apparatus, followed by solidification of the mass in a second reactor provided with powerful stirrers, the reactor acting also as a concentrator. The solidification of the product occurs during concentration, further water being evaporated during and after solidification.

Obviously, the heat-exchange coefficient in a plastic or solid mass is very low, so that concentration proceeds very slowly (it normally requires 4 to 6 hours). Additionally, the product is irregularly heated and lack of uniformity of temperature results in a heavy degradation of the product, so that yields are low, this being, probably the cause for the unrestricted distribution of the molecular weights.

Acid catalyst, such as sulphuric acid, or basic catalysts such as sodium hydrate or potassium carbonate, can be used in order to accelerate the precipitation and solidification of paraformaldehyde. However, the use of such catalysts is objectionable in that they remain in the final product, the ash content of which is therefore excessive. Moreover, with basic catalysts, the alkali gives rise to an increase in pH and undesirable side reactions, such as the Cannizzaro reaction or formation of yellow-brown coloured sugars.

Further, highly basic amines can be used as catalysts in order to avoid a high ash content. However, these amines should be used in relatively high quantities in order to obtain the desired effect of accelerating solidification and precipitation of the polymer, and a paraformaldehyde is obtained which is too high in pH value. A series drawback of the use of these catalysts is that the resulting products are of excessively high molecular weight and melting point.

The invention provides a simple and economically convenient process for preparing paraformaldehyde of a controlled molecular weight, comprising the steps of concentrating commercial formalin in a liquid phase to obtain a composition titrating 75 to 93% formaldehyde, rapidly cooling the concentrated liquid formalin till solidification of the mass occurs, and curing the solidified mass in the presence of a regulator for polymerization or polycondensation, as discussed below.

The polymerization during the curing equation:

$$XHO(CH_2O)_nH \rightarrow HO(CH_2O)_{xn}H + (X-1)H_2O$$

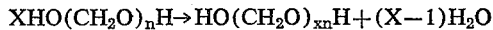

As indicated in the above equation the molecular weight, hence the melting point increases during the curing step.

It should be noted that the regulators are active relatively to the so-called curing stage and not to the precipitation or solidification stage. In addition to controlling the molecular weight of paraformaldehyde these regulators ensure much higher rate of curing than would be possible in their absence.

The uncured product is semi-solid in appearance and it packs and is difficult to handle, whereas after curing it is of a solid character, has no tendency to pack, is easy to handle and maintains its formaldehyde content substantially unaltered in storage.

In one embodiment of the invention the water which at the start of the curing process is in a chemically bound form in the polymeric chain and gradually separates during the curing step is not removed, though this would be possible, and simply remains absorbed within the solid.

After the curing step, the paraformaldehyde may easily, if desired, be crushed and ground.

The temperature is not critical during the curing step but the curing is preferably carried out at temperatures lower by 10 to 20° C. than the softening (or melting) point of the product. (The softening point depends upon the formaldehyde content and extent of curing). For instance, a formalin titrating about 80% is rapidly cooled to 30° C., whereupon curing starts, during which the temperature gradually rises up to about 50° C. at the end of the curing step.

The substances which may be employed in the process of the invention as regulators are of various type, their effects during curing being different. In particular the molecular weight of the product depends upon the quantity of catalyst and, above all, upon its chemical nature. The regulators are therefore effective in regulating the molecular weight and distribution of the molecular weight.

The regulators may be subdivided into two classes, the former including basic organic substances of a $pK_b$ ranging between 6 and 12. For example pyridine, p-toluidine, phenyl hydrazine, hydroxylamine, aniline and trimethyldodecyl-ammonium hydroxide. By means of the regulators of this former class products of low molecular weight and low melting point are obtained.

In the latter class are included both high temperature reaction products of formaldehyde and highly basic amines ($pK_b$ between 2 and 6), such as, for instance, the reaction products of butylamine and formaldehyde, and middle basic organic substances, preferably heterocyclic compounds formed by one, two or three hexatomic rings which are condensed and hydrogenated, the heteroatom or atoms being nitrogen. Examples of these are piperazine and dodecahydro 1,4,7,9b tetra-azonapthalene. By means of regulators of this latter class formaldehyde is obtained of average molecular weight and melting point.

Surprisingly, some of these regulators, such as for example dodecahydro-1,4,7,9b-tetrahydronaphthalene, exert a stabilizing effect on commercial formalines, in that they prevent the precipitation of solid insoluble products within wide ranges of temperature.

As far as the regulators of the latter class which are obtained form the amine-formaldehyde reaction are concerned, it should be noted that they cannot be obtained simply by adding the amine during the curing step or during the preceding steps. Such addition gives altogether different effects as compared with those obtained by the addition of the preformed reaction products with formaldehyde.

The quantity of regulator to be used depends upon the desired extent of activity and the quantity of formic acid in the product; the value may range between 0.001 and 0.5 by weight of formaldehyde.

The quantity of basic substance, as such or in the condensed form with formaldehyde, required for obtaining the desired effect, is generally lower than would theoretically be required for neutralizing the formic acid in the reacting mixture.

Though the addition of the described regulators may be carried out in different ways and at different times during the process, it is preferable, for the sake of convenience, to add the regulator dissolved in water or in an aqueous formaldehyde solution to the concentrated solution of formaldehyde, before cooling.

The curing period for obtaining a product easy to handle ranges between 2 and 50 minutes.

The concentrate formalin may be cooled in a number of ways. In a preferred embodiment of the invention a process described in the Italian Pat. No. 791,443 is employed. It comprises the step of solidifying by cooling an aqueous solution of formalin titrating between 75 and 96%, to form discrete subdivided particles, at a temperature equalling or slightly higher than room temperature.

In commercial operation formalin titrating 75% or over is fed by means of sprayers, atomizers, mist-forming devices or prillers into towers in which the product is cooled by admitting air or other insert gas at a temperature ranging between −20° and 60° C., preferably between 0° and 40° C.

The solid product in a granulated form or in powder form is collected in an appropriate manner, such as on a band conveyor, and is cured at a temperature below the softening point for the periods already mentioned.

It is also possible to effect cooling on a cooled band or cylinder.

The cured product is of substantially unaltered titre with respect to the starting concentrated formalin. However, the formaldehyde content may be increased by treating the cured product at a relatively low temperature, in any case lower than the softening point of the product, so as to obtain paraformaldehyde with a final formaldehyde content between 92 and 98%, without appreciably affecting the values of the molecular weight.

More particularly, with the catalysts of the former class values of about 90% are reached, the catalysts of the latter class giving values up to 97–98%.

The treatment is usefully carried out in hot air driers in a fluid bed, or in hot tray driers under a vacuum.

An inherent property of the product is that the quantity of formaldehyde evaporating during drying is extremely low. More particularly it is lower than in processes in which polymerization and concentration are carried out simultaneously or at high temperature or in a process combining these features.

Aqueous formaldehyde solutions of concentrations higher than 75%, which may usefully be converted to paraformaldehyde by the process according to the invention, may be obtained in a number of ways. However, in a preferred embodiment of the invention, the operation is carried out by a process described in the Italian Pat. No. 791,442, which is characterized by carrying out concentration of the aqueous formaldehyde solutions at a temperature lower than the point of stability of the concentrated aqueous solution to be obtained, the concentration being carried out in two or more stages and for a period shorter than necessary for solidification and/or appearance of solid bodies in the mass, and there being interposed between one stage and another a curing period at a temperature above the stability point.

The process of the invention thus yields a paraformaldehyde of controlled molecular weight, which is ash-free, of high solubility and yields when dissolved in water solutions of pH values which do not differ from those of commercial formalin solutions, ranging between 2.8 and 5.5. Finally, it is possible to obtain paraformaldehyde in the form of particles which do not tend to pack and are therefore easy to handle even when the titre is relatively low, such as between 75 and 90%.

The following examples illustrate the invention.

EXAMPLE 1

The polymerization regulator is prepared by reacting an aqueous 35% solution of methylamine and commercial formalin in a ratio of 1 to 7 for 20 hours at 100° C., followed by cooling. A solution is obtained which contains 50 g./l. of the regulator calculated as methylamine. The reaction of the methylamine with the formaldehyde is denoted by the pH value in the solution which falls from 9 initially to 4.8 on completion of reaction.

A concentrated formalin solution is prepared by concentrating commercial formalin in a glass flask provided with a stirrer and heated in an oil bath. During concentration a pressure of 150 mm. Hg is maintained and commercial formalin containing 38% formaldehyde is steadily supplied so as to maintain the level constant.

When the formaldehyde content in the concentrated formalin has reached 79%, concentration is stopped and one half of the concentrated composition is transferred to another flask. The other half is retained as a control for comparison. A temperature of about 105° C. is maintained therein to prevent clouding, and 0.01% of the regulator as described is added, the mass being homogenized.

Finally, the two portions of concentrated formalin are poured into two trays so as to distribute the product uniformly in layers of 4–6 mm. in height, the trays being cooled by causing water at about 15° C. to flow along their walls till the mass solidifies. After solidification, the water flow is stopped and curing is started.

Samples are periodically withdrawn from the two trays and analyzed, the skin at the surface being discarded.

The analysis consists of determining the melting point, the pH at 20° C. of aqueous solutions containing 20% formaldehyde and obtained by dissolving the paraformaldehyde in water in the hot, and the content of bound water. The bound water, which is in the form of polyoxymethyleneglycols, is determined from the difference between the total water and the free water, as determined by the Karl Fischer method. The total water content is determined by the gas-chromatographic method after decomposition. Both the melting point and bound water are a function of the molecular weight of the product. For determining the melting point the product is heated in a closed test tube, rather rapidly in order to prevent any further variation in molecular weight during analysis.

Table 1 summarizes the results. It will be noted that in the presence of the catalyst the molecular weight initially rises rapidly (as shown by the values of the melting point and bound water), but remains constant during further curing. In the test carried out without regulation the molecular weight rises very slowly.

The data further show the regulating effect, in the presence of the methylamine-formaldehyde condensate, on the final value of the molecular weight.

TABLE 1

Tray 1 (with catalyst)

| Time (hrs.) | Appearance | M.P., °C. | $CH_2O$ (wt. percent) | pH | Bound water (wt. percent) |
|---|---|---|---|---|---|
| 0.1 | Breakable-waxy | 85–95 | 79 | 3.7 | 6.5 |
| 0.2 | Breakable | 100–110 | | | 5.8 |
| 1 | do | 105–115 | 80 | 3.8 | 5.3 |
| 5 | do | | | | |
| 20 | do | 105–115 | 80 | | 5.2 |

Tray 2 (standard)

| 0.1 | Pasty | 50–80 | 79 | 3.8 | 12 |
| 0.2 | do | 50–80 | | | 12 |
| 1 | Waxy | 60–80 | 79.5 | 3.7 | 18 |
| 5 | do | 80–90 | | | 8 |
| 20 | Friable-waxy | 90–120 | 80 | | 5.0 |

EXAMPLE 2

A formaldehyde composition titrating 83% is obtained by the method described in the Italian Pat. No. 791,442. The starting commercial formalin titrates 35% by weight and contains 2.5% methanol and 0.01% formic acid. The formalin is collected, after concentration, in a container which is kept at 110° C. and 2 atm.

The composition is converted to paraformaldehyde by the process of the invention, a control being carried out by way of comparison, by feeding concentrated formalin to a two-arm kneading machine provided with a heating jacket and a device for maintaining a vacuum.

The apparatus comprises a prilling chamber provided with a solid cone pulverizer at the top and a collecting tray at the bottom. The prilling chamber is 4.5 m. high. By means of the pulverizer drops of an average diameter of 0.2 mm. can be obtained.

The container for the concentrated formalin is connected by externally heated tubes both with the kneading machine and pulverizer nozzle, the tubes further enclosing means for conveying the solution of the catalyst.

The regulator comprises a commercial formalin solution of pyridine and is used in a quantity of 0.09% by weight with respect to the concentrated formalin, which is fed by means of a pump and piston.

In test 1 the paraformaldehyde is prepared with regulator. Test 2 is carried out like test 1 but without a regulator.

The solid product collected in the tray at the bottom of the prilling chamber after a given period of curing is charged to a fluid bed hot air drier in which a linear air flow rate of 0.35 m./sec. and an entry temperature of 125° C. to the distributor plate are maintained.

Tests 3 and 4 are carried out in the kneading machine by maintaining a pressure of 120 mm. Hg and using water at 90° C. as a heating means. Test 3 employs the catalyst of test 1 in the same quantity, no catalyst being used in test 4.

Results of test 1 and 2

In both cases a solid product is collected on the tray at the bottom of the chamber. After 30 minutes curing the product of test 1 is flowable, does not show a packing tendency and fluidizes evenly in the fluid bed drier. The product obtained in test 2 after 30 minutes curing is not flowable, easily packs and is unsuitable for drying in a fluid bed. This product reaches the properties of the product from test 1 only after ten hours curing.

The product obtained in test 1 reaches a 94.5% formaldehyde content after 50 minutes dwell in the drier. This value keeps constant even after a further drying period, but a decrease in weight is observed. The finished product yield after the drying period of 50 minutes is 95.5% with respect to the concentrated formalin.

Results of tests 3 and 4

After about 5 hours dwell in the kneading machine solid products are obtained, in powder and lump form respectively. The yield and content amount to 75% and 94.1% in test 3 and 78% and 94.8% in test 4.

Table 2 summarizes the values of the melting point of the bound water (a function of the molecular weight) and the water-soluble percentage in respect of tests 1 and 4 on samples, taken at the start of the test, after storage for five days and two months respectively. Storage is carried out in closed containers at room temperature.

In these tests the water-soluble percentage represents the percentage by weight of paraformaldehyde dissolved in water after contacting for two minutes with water at 100° C. (a water-paraformaldehyde ratio of 7:3 being maintained), cooling to room temperature and titrating the filtrate after filtering at 20° C.

It will be seen from the table that the molecular weight of the product of test 1 is lower than in test 4, moreover the molecular weight and solubility of the product of test 1 keep practically unaltered with time, while in test 4 ageing occurs during storage.

TABLE 2

| Time | $CH_2O$ (wt. percent) | M.P. (° C.) | Bound water (wt. percent) | Solubility (wt. percent) |
|---|---|---|---|---|
| Test 1 | | | | |
| 0 | 94.6 | 118–132 | 5.4 | 93 |
| 5 days | 94.4 | 120–128 | 5.4 | 91 |
| 2 months | 94.6 | 122–131 | 5.3 | 91 |
| Test 4 | | | | |
| 0 | 94.8 | 140–155 | 4.5 | 85 |
| 5 days | 94.9 | 145–160 | 3.9 | 78 |
| 2 months | 95.1 | 149–168 | 3.1 | 65 |

EXAMPLE 3

Paraformaldehyde is prepared in the manner described in the second example with the difference that the products collected at the bottom of the prilling chamber are not dried. Various polymerization regulators belonging to the classes already described are employed. The quantity of regulator is such that it can theoretically neutralize 35 to 45% of the formic acid present in the concentrated formalin. The formaldehyde content in the concentrated formalin is 85–86%.

The products obtained at the bottom of the prilling chamber are cured for 40 minutes. After this period of time they are found to be highly flowable and without packing tendency, and they maintain these properties in the course of storage in polythene-lined bags.

The value of the polymerization degree $n$ and water-solubility are analytically determined. (The polymerization degree $n$ can be defined by the formula:

$$HO(CH_2O)_nH$$

and is calculated from the content of bound water by the relation $$n = 0.60 \left( \frac{100 - A}{A} \right)$$

wherein A is the percentage of bound water.) The bound water is determined by subtracting from the total water (determined, after decomposition, by a gas-chromatographic method) the free water content determined by the Karl Fischer method. The gas-chromatographic analysis shows that the products actually contain formaldehyde and water only; methanol and further impurities are present in very low quantities, the error due, for instance, to the presence of hemiformals of methanol being negligible.

Table 3 summarizes the results of the tests.

TABLE 3

| Regulator | $n$ | Solubility, percent |
|---|---|---|
| N-methylanyline | 9.5 | 89 |
| Trimethyl-dodecyl-ammoniumhydroxide | 12.7 | 87 |
| Dodecahydro-1,4,7,9b-tetraazonaphthalene | 19.4 | 92 |

The values of solubility were determined as in Example 2. It should be noted that the product fully and thoroughly solubilizes in water on extending the heating period. The pH values of the aqueous solution were in every instance lower than 5.

We claim:

1. A process for preparing paraformaldehyde comprising the steps of:
   (a) rapidly cooling an aqueous formaldehyde solution containing from 75 to 93% formaldehyde by weight until the formaldehyde therein solidifies;
   (b) adding at least one polymerization regulator to said formaldehyde solution prior to cooling; and
   (c) curing the solidification product from step (a) in the presence of from 0.001 to 0.5% by weight, based on the formaldehyde, of at least one of said polymerization regulators at a temperature below the melting point of the solidification product from step (a) for a period of time of from 2 minutes to 50 minutes, whereby paraformaldehyde titrating 75 to 98%, of high solubility, ash-free, having a pH between 2.8 and 5.5 in solution, a controlled molecular weight and non-packing characteristics is obtained, said polymerization regulator being selected from the group consisting of pyridine, p-toluidine, phenyl hydrazine, hydroxylamine, aniline, trimethyldodecyl ammonium hydroxide, the condensation product of formaldehyde and a member selected from the group consisting of methylamine and butylamine, n-methyl aniline, piperazine and dodecahydro-1,4,7,9b-tetraazonaphthalene.

2. The process of claim 1, wherein said curing is conducted at a temperature of from 10 to 20° C. lower than the melting point of the solidification product.

3. The process of claim 1, wherein the quantity of polymerization regulator present is lower than that theoretically required to neutralize any formic acid present in the solidification product.

4. The process according to claim 1, which further comprises evaporating water subsequent to curing.

5. The process of claim 1, wherein said aqueous formaldehyde solution is concentrated by cooling to yield discrete subdivided particles at a temperature of at least room temperature.

6. The process of claim 1, wherein the cured product and the aqueous formaldehyde solution are of substantially unaltered titre.

7. The process of claim 1, wherein the final formaldehyde content of the cured product is between 92 and 98%.

8. The process of claim 1, wherein cooling is conducted by contacting said aqueous formaldehyde solution in particulate form with a cooling gas at a temperature of −20 to 60° C.

9. The process of claim 1, wherein said paraformaldehyde has a polymerization degree $n$ determined by the formula:

$$HO(CH_2O)_nH$$

where $$n = \frac{0.60(100 - A)}{A}$$

wherein A is the percentage of bound water.

References Cited

UNITED STATES PATENTS

| 2,092,422 | 9/1937 | Naujoks | 260—615.5 |
| 2,373,777 | 4/1945 | Peterson | 260—615.5 X |
| 2,568,016 | 9/1951 | Maclean et al. | 260—615.5 |
| 2,568,017 | 9/1951 | Maclean et al. | 260—615.5 |
| 2,568,018 | 9/1951 | Maclean et al. | 260—615.5 |
| 2,704,765 | 3/1955 | Smithson | 260—615.5 |
| 2,936,298 | 5/1960 | Hudgin et al. | 260—615.5 UX |
| 3,316,309 | 4/1967 | Mann et al. | 260—615.5 |
| 3,388,172 | 6/1968 | Dakli et al. | 260—615.5 |
| 3,422,070 | 1/1969 | Ishida et al. | 260—615.5 X |
| 3,446,854 | 5/1969 | Hughes et al. | 260—615.5 |

FOREIGN PATENTS

| 55,429 | 4/1967 | East Germany | 260—615.5 |
| 1,123,107 | 2/1962 | Germany | 260—615.5 |
| 1,127,080 | 4/1962 | Germany | 260—615.5 |

HOWARD T. MARS, Primary Examiner

UNITED STATES PATENT OFFICE
CERTIFICATE OF CORRECTION

Patent No. 3,772,392     Dated November 13, 1973

Inventor(s) Teo Paleologo et al.

It is certified that error appears in the above-identified patent and that said Letters Patent are hereby corrected as shown below:

In the heading to the printed specification, after line 8, insert -- Claims priority, application Italy 18471-A/67 July 17, 1967 --.

Signed and sealed this 3rd day of September 1974.

(SEAL)
Attest:

McCOY M. GIBSON, JR.
Attesting Officer

C. MARSHALL DANN
Commissioner of Patents